United States Patent [19]
Ziegler et al.

[11] Patent Number: 5,605,386
[45] Date of Patent: Feb. 25, 1997

[54] SOLENOID VALVE FOR SLIP-CONTROLLED HYDRAULIC BRAKE SYSTEMS IN MOTOR VEHICLES

[75] Inventors: Ewald Ziegler, Heimsheim; Volker Holzgrefe, Ditzingen; Norbert Mittwollen, Markgroeningen, all of Germany

[73] Assignee: Robert Bosch GmbH, Stuttgart, Germany

[21] Appl. No.: 462,364

[22] Filed: Jun. 5, 1995

[30] Foreign Application Priority Data

Jul. 28, 1994 [DE] Germany ............... 44 26 796.7

[51] Int. Cl.⁶ .............. F16K 31/06; B60T 8/36; F15B 13/044; F15B 9/12
[52] U.S. Cl. ............... 303/119.2; 251/129.02; 251/129.07
[58] Field of Search ............... 303/84.1, 84.2, 303/119.2, DIG. 1, DIG. 2, 900, 901; 251/129.02, 129.07, 129.15

[56] References Cited

U.S. PATENT DOCUMENTS 5,076,538  12/1991  Mohr et al. ............ 251/129.02 X
5,401,087  3/1995   Goosens ................ 303/119.2
5,476,243  12/1995  Oehler et al. .......... 251/24

FOREIGN PATENT DOCUMENTS 3934771  3/1991  Germany .
2284877  6/1995  United Kingdom .

*Primary Examiner*—Josie Ballato
*Attorney, Agent, or Firm*—Edwin E. Greigg; Ronald E. Greigg

[57] ABSTRACT

This invention achieves a setting of a reduced flow area which is active after a closed position of the valve. The solenoid valve has a seat valve with a closing element which is surrounded with a clearance by a hollow cylindrical shoulder. Formed in a valve body provided with the valve seat of the seat valve is an annular channel into which the shoulder engages with a slight radial gap in the closed position of the valve. On the outlet side of the seat valve, the pressure fluid channel leads to the two end faces of a magnet armature which actuates the seat valve. Given a pressure gradient between the pressure fluid inlet and the pressure fluid outlet, after a closed position of the solenoid valve the seat valve is capable of assuming a partly open position, since valve opening forces are compensated by pressure disequilibrium at the magnet armature. The valve can be used in slip-controlled hydraulic brake systems of motor vehicles.

3 Claims, 2 Drawing Sheets

SOLENOID VALVE FOR SLIP-CONTROLLED HYDRAULIC BRAKE SYSTEMS IN MOTOR VEHICLES

PRIOR ART

The invention proceeds from a solenoid valve as defined hereinafter.

Such a valve is disclosed in DE 39 34 771 C1, FIG. 3. It has a control piston which is arranged in the valve dome, forms a stop for the magnet armature, and is guided longitudinally displaceably on a pin which projects from the valve body of the seat valve and penetrates the magnet armature. With its base, which is averted from the armature, the control piston bounds a control chamber which is connected by means of a pressure fluid channel penetrating the pin and the control piston along the same axis to the pressure fluid inlet of the known valve. While the magnet armature is pressure compensated at both end faces, pressure introduced into the control chamber is capable of displacing the control piston axially against a stop. As a result, the stroke of the magnet armature is reduced by a predetermined amount, resulting in a restriction of the flow area of the seat valve.

This mode of operation of the known valve is usable in slip-controlled hydraulic brake systems in which the pressure fluid inlet is connected to a master brake cylinder and the pressure fluid outlet is connected to a wheel brake cylinder. If, for example, in the case of brake slip control the valve is switched into its closed position by exciting the solenoid and generates in conjunction with the reduction in the pressure in the wheel brake cylinder a pressure gradient of sufficient intensity between the pressure fluid inlet and the pressure fluid outlet, this effects the displacement described above of the control piston, with the result that upon opening of the valve the abovementioned restriction of the flow area becomes active as long as the pressure difference exists between the inlet and outlet. Because of the reduced pressure gradient, in the case of a pressure buildup of a brake slip control following a pressure reduction, the reduction in the flow area has a favorable effect on the control quality and the noise response of the brake system. In the case of normal braking without the risk of locking, by contrast, the full flow area of the valve is available, and this promotes a short response time of the brake system when the brakes are actuated.

In the case of the known valve, however, the fixed setting of the restricted flow area is disadvantageous, because the flow rate is hereby subjected to fluctuations which are a function of the differential pressure. Moreover, the flow rate is very much a function of the absolute dimension of the flow area, that is to say the stop requires a very narrow tolerance.

ADVANTAGES OF THE INVENTION

The solenoid valve according to the invention has, by contrast, the advantage that after the seat valve has opened from the closed position its flow area is set to small, largely constant flow rates because of the pressure drop at the at least one gap, which forms a restricting point, and of the pressure imbalance thereby occurring at the magnet armature and tappet. The solenoid valve therefore acts in this partly opened position as a flow control valve. The flow area can be influenced easily by appropriate dimensioning of the geometrical relationships at the annular channel and shoulder as well as by tuning the resetting spring. However, it is a substantial advantage that this mode of operation of the valve is achieved without additional components and sealing means.

The embodiment of the solenoid valve specified is distinguished in an advantageous way by a simple configuration which can be produced in a cost effective way using conventional production methods.

BRIEF DESCRIPTION OF THE DRAWINGS

An exemplary embodiment of the invention is represented in a simplified way in the drawing and explained in more detail in the following description.

DESCRIPTION OF THE EXEMPLARY EMBODIMENT

Figure 1:
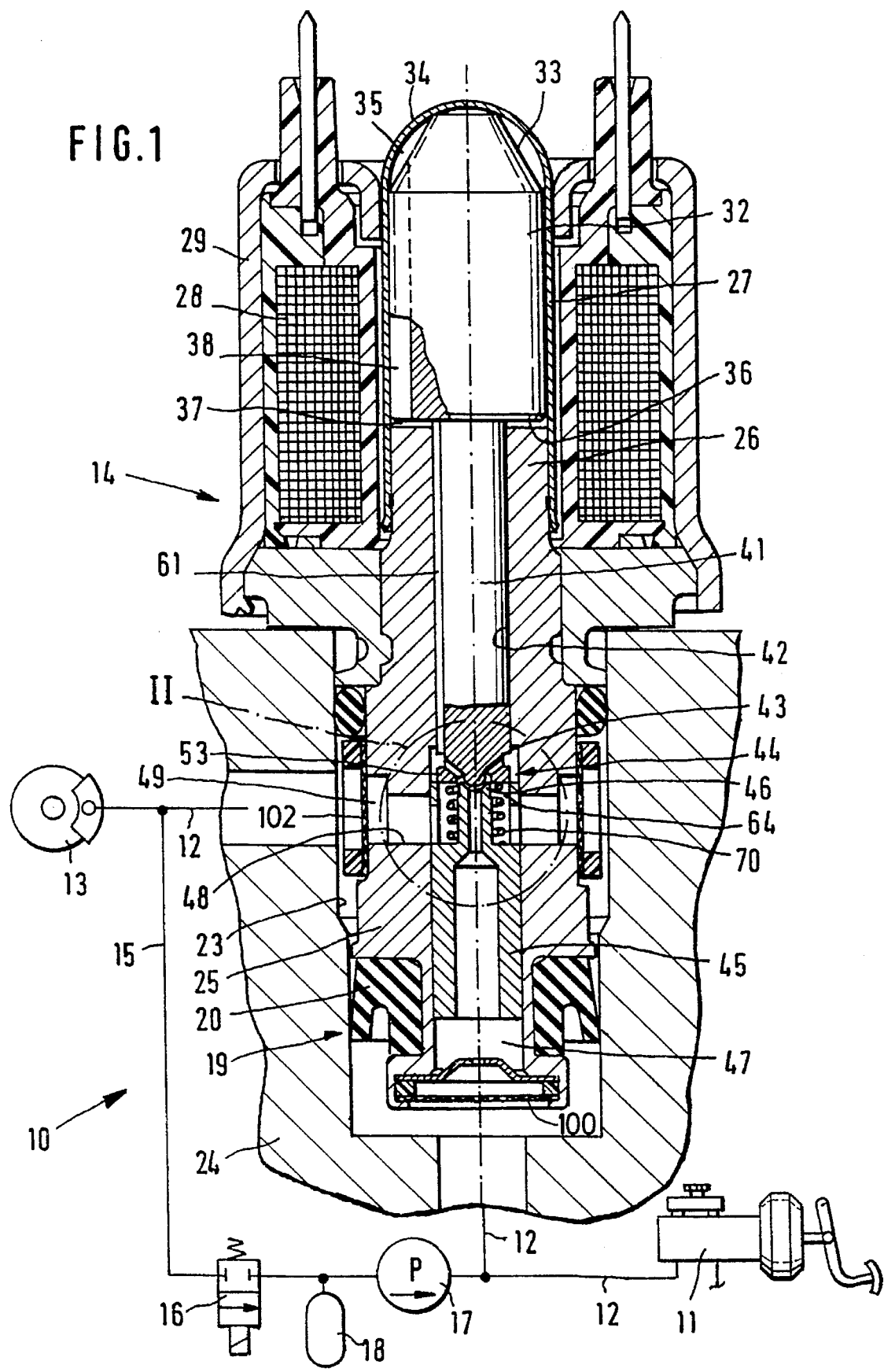
FIG. 1 shows a longitudinal section through a solenoid valve in a diagrammatically indicated brake system of a motor vehicle.

A brake-slip controlled hydraulic brake system 10 of a motor vehicle, which is reproduced in a very simplified fashion in FIG. 1, has a dual-circuit master brake cylinder 11 from which a brake line 12 issues to a wheel brake cylinder 13. Arranged in the course of the brake line 12 is a solenoid valve 14 which is in the form of the 2/2-way valve, open when deenergized, and acts as an inlet valve in the case of slip control. Issuing on the wheel brake cylinder side from the brake line 12 is a return line 15 which bypasses the valve 14 and is connected to the brake line on the master brake cylinder side. Located in the return line 15 are an outlet valve 16 and a return conveyor pump 17 for brake fluid extracted from the wheel brake cylinder 13 in the case of slip control. A storage chamber 18 is connected to the return line 15 between the outlet valve 16 and the return conveyor pump 17. In addition, provision is made of a nonreturn valve 19 which is in the form of a sealing sleeve 20 which, bypassing the solenoid valve 14, permits pressure fluid to be returned from the wheel brake cylinder 13 to the master brake cylinder 11.

The solenoid valve 14 has a housing 25 mounted in a bore 23 of a valve block 24. A sleeve-shaped valve dome 27 is plugged onto a pole core 26, formed by the housing 25, and connected to said core in a pressuretight fashion. The valve dome 27 is surrounded by an annular solenoid 28 having a bell-shaped housing 29.

An essentially circular cylindrical magnet armature 32 is accommodated in a longitudinally movable fashion in the valve dome 27. On the side averted from the pole core, the magnet armature 32 bounds by means of its end face 33 a first chamber 35 located inside a hemispherical cap 34 of the valve dome 27. The magnet armature 32 adjoins a second chamber 37 with its end face 36 on the pole core side. The magnet armature 32 is provided on the circumference with a longitudinal groove 38 which connects the two chambers 35 and 37 such that it conducts pressure fluid.

A tappet 41 projects from the magnet armature 32 and is firmly connected to the latter. Said tappet is accommodated in a continuous bore 42 in the housing 25 with a slight radial play. The tappet 41 is provided at its end averted from the armature with an integrally formed, hemispherical closing element 43 of a seat valve 44 of the solenoid valve 14. A valve body 45 which has a longitudinal throughbore and a valve seat 46 of the seat valve 44 is pressed into the housing bore 42 with the same axis as the tappet 41. The valve body 45 is connected to a pressure fluid inlet 47 which includes a filter 100, on the master brake cylinder side, of the solenoid valve 14. The transverse bore 48 which crosses the housing bore 42 in the region of the seat valve 44 forms a pressure fluid outlet 49, which includes a filter 102 on the wheel brake side, of the valve 14. The magnet armature 32, the tappet 41, the closing element 43 and the valve seat 46 of the seat valve 44 are arranged, together with the valve body 45, with the same axis relative to one another.

Figure 2:
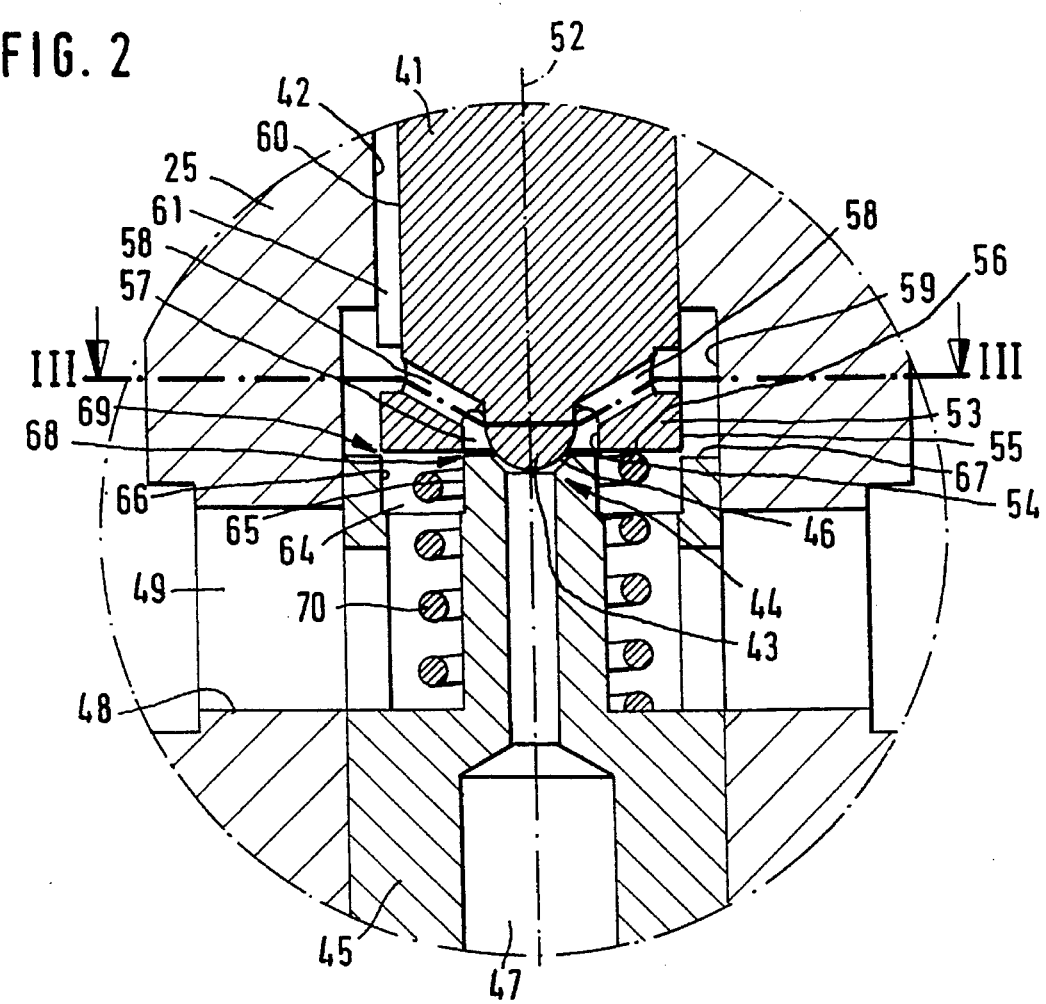
FIG. 2 shows the region, denoted by II in FIG. 1 of the valve on a different scale.
Figure 3:
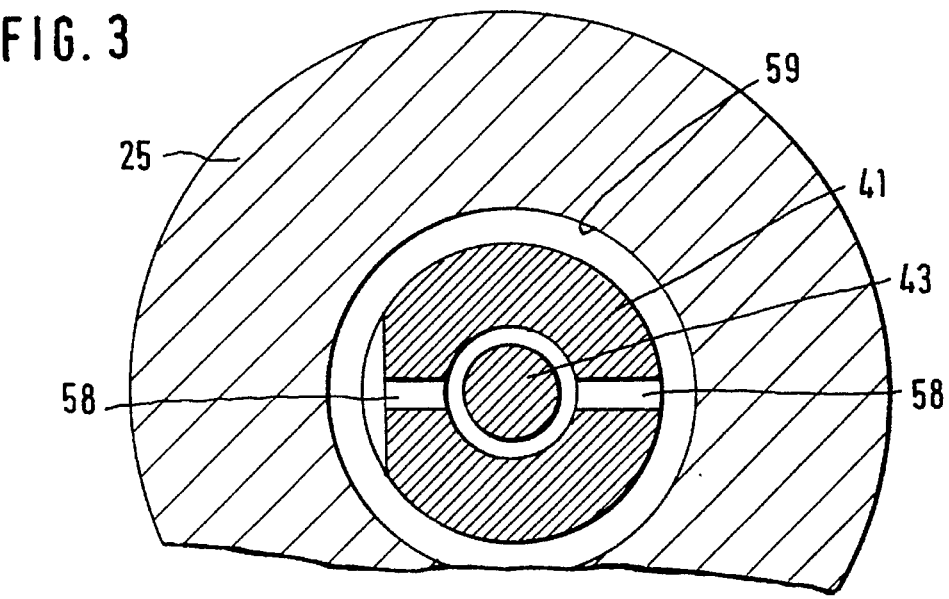
FIG. 3 shows a cross section through the valve along the line III—III.

As described below with the aid of FIGS. 2 and 3, there is integrally formed on the tappet 41 a hollow cylindrical shoulder 53 which extends concentrically with the axis 52 of the tappet and surrounds the closing element 43 of the seat valve 44 with a clearance. The inner and outer lateral surfaces 54 and 55 of said shoulder extend parallel to each other, and its end face 56 on the valve body side extend at right angles to the tappet axis 52. Bores 58 which extend approximately radially and open into a section 59 of the housing bore 42 which surrounds the tappet 41 with a radial play in the region of the seat valve 44 run out from an annular space 57 formed between the closing element 43 and the shoulder 53. Starting from the shoulder 53, the tappet 41 is provided on the circumferential side with a flat surface 60, or a longitudinal groove, leading to the magnet armature 32. The bores 58, the flat 60 of the tappet 41 and the longitudinal groove 38 of the magnet armature 32 form a pressure fluid channel 61 which connects the outlet of the seat valve 44, which opens into the annular space 57 located between the closing element 43 and the shoulder 53 such that the pressure fluid channel conducts pressure fluid, to the two chambers 35 and 37 of the valve dome 27.

The valve body 45 is provided concentrically with the valve seat 46, that is to say with the same axis as the tappet 41 and its closing element 43 as well as the shoulder 53, with an annular channel 64 which is open towards the tappet. With reference to its cross section, said annular channel has bounding walls 65 and 66 which extend parallel to the tappet axis 52. The annular channel 64 is bounded towards the shoulder 53 by an end face 67 of the valve body 45 which is on the seat side and extends at right angles to the tappet axis 52. The dimensions of the annular channel 64 are sized such that when the solenoid valve 14 is switched over into the closed position the shoulder 53 of the tappet 41 can dip into the annular channel while maintaining a small radial inner and outer gap 68 and 69, respectively. There is thus an axial overlap of the shoulder 53 and annular channel 64 in the closed position of the valve 14. Finally, a resetting spring 70 is also accommodated in the annular channel 64, which is connected on the base side to the pressure fluid outlet 49 of the solenoid valve 14. Said spring acts on the one hand on the valve body 45 and on the other hand on the shoulder 53 of the tappet 41, and serves the purpose of transferring the closing element 43 from the closed position of the seat valve 44 by longitudinal displacement of the tappet 41 and magnet armature 32 into the open position, which is defined by the action of the magnet armature on the valve dome cap 34.

The mode of operation of the solenoid valve 14 is as follows:

When braking is initiated without the risk of locking by the vehicle driver, the valve 14 assumes its neutral position, that is to say the seat valve 44 is located in its open position. The pressure generated by actuating the master brake cylinder 11 effects a rise in pressure in the wheel brake cylinder 13 by displacing partial quantities of pressure fluid in the brake line 12. In this case, the path of the pressure fluid is from the pressure fluid inlet 47 through the valve body 45 and the valve seat 46 of the seat valve 44 and, further, through the annular channel 64 to the pressure fluid outlet 49 of the solenoid valve 14. The magnet armature 32 with the tappet 41, around which pressure fluid flows, is pressure compensated, that is to say it is loaded only by the spring force of the resetting spring 70 in the direction of the valve dome 27. If the driver decreases the brake pressure or if he terminates braking, the path of the pressure fluid is in the reverse flow direction through the seat valve 44 and, as the case may be, through the nonreturn valve 19, which is connected in parallel.

In the event of braking with a risk of locking, the solenoid valve 14 is switched by excitation of the solenoid 28 into the working position, in which the seat valve 44 assumes its closed position by displacement of the magnet armature 32 against the force of the resetting spring 70. At the same time, the outlet valve 16 in the return line 15 is switched into the passing position and the return conveyor pump 17 is set in operation. By extracting partial quantities of pressure fluid from the wheel brake cylinder 13 and conveying it back to the master brake cylinder 11, pressure is reduced on the wheel brake side and the risk of locking is reduced. In the phase, following a pressure reduction, for maintaining pressure in the wheel brake cylinder 13, the solenoid valve 14 remains in the working position, while the outlet valve 16 in the return line 15 is switched into the closed position.

For the pressure buildup in the wheel brake cylinder 13 following pressure maintenance, the outlet valve 16 maintains its closed position and the solenoid valve 14 is no longer energized. Because of the lack of excitation of the solenoid 28, the magnet armature 32 is displaced longitudinally by means of the pressure generated by the master brake cylinder 11 onto the closing element 43, and the force of the resetting spring 70 is longitudinally displaced in the direction of the valve dome 27. Pressure fluid flows from the outlet of the opening seat valve 44 through it into the annular space 57 inside the shoulder 53, as well as through the bores 58 into the section 59 of the housing bore 42 on the tappet side. In this case, a pressure which is reduced by comparison with the pressure at the pressure fluid inlet 47 of the solenoid valve 14 is set up on the outlet side of the seat valve 44. This reduced pressure is transmitted through the pressure fluid channel 61 onto the two end faces 33 and 36 of the magnet armature 32. Pressure fluid flows from the annular space 57 and the housing bore section 59 into the annular channel through the restricting points formed by the inner and outer gap 68 and 69 between the shoulder 53 of the tappet 41 and the bounding walls 65 and 66 of the annular channel 64 in the valve body 45. A drop in pressure occurs in this case, with the result that a pressure which is lower than the pressure at the magnet armature 32 acts on the circular end face 56 of the shoulder 53. Since the circular surface, corresponding to the end face 56 of the shoulder 53, at that end face 33 of the magnet armature 32 remote from the seat valve is therefore not pressure compensated, a pressure disequilibrium occurs at the magnet armature 32 with the tappet 41 and causes a resultant force at the armature which acts in the direction of the valve seat 46 and against which the hydraulic opening force on the closing element 43 and the spring force of the resetting spring 70 are directed. These forces compensate one another in a partly open position of the seat valve 44 in which the end face 56 of the shoulder 53 assumes a position in the region of that end face 67 of the valve body 45 on the tappet side. Largely constant flow rates of the pressure fluid, which are very much lower by comparison with the open position of the seat valve 44, now flow from the pressure fluid inlet 47 to the pressure fluid outlet 49 of the solenoid valve 14. The solenoid valve 14 therefore acts in this partly open position as a compensated flow control valve.

In the further course of the brake slip control, the solenoid valve 14 is switched in rapid succession by renewed excitation of the solenoid 28 into the closed position and, by switching off the excitation, into the previously described partly open position. With increasing equalization of the pressure in the wheel brake cylinder 13 to the pressure of the master brake cylinder 11, the pressure disequilibrium at the magnet armature 32 is reduced, with the result that the hydraulic opening force on the closing element 43 and the spring force of the resetting spring 70 finally predominates and transfer the seat valve 44 into the open position defined by stoppage of the magnet armature 32 on the valve dome cap 34. It is now possible for the pressure fluid to flow without restriction through the solenoid valve 14. The foregoing relates to preferred exemplary embodiments of the invention, it being understood that other variants and embodiments thereof are possible within the spirit and scope of the invention, the latter being defined by the appended claims.

We claim:

1. A solenoid valve (14), for slip-controlled hydraulic brake systems (10) in motor vehicles, having the following features:

a magnet armature (32) surrounded with pressure fluid at opposite end faces (33, 36) is accommodated in a longitudinally movable fashion in a valve dome (27), the valve (dome (27) is surrounded by a solenoid (28), a tappet (41), said tappet (41) has a closing element (43) of a seat valve (44), said tappet is firmly connected to the magnet armature (32) and projects therefrom along a tappet axis (52), a fixed valve body (45) with a valve seat (46) of the seat valve (44) is accommodated in a housing bore (42) of the solenoid valve (14) leading from a pressure fluid inlet (47), an annular channel (64) is formed into the valve body (45) of the seat valve (44) with bounding walls (65, 66) extending parallel to the tappet axis (52), said annular channel (64), is arranged centrally relative to the valve seat (46) and is open axially towards the tappet (41), and is connected on a base side to a pressure fluid outlet (49) of the solenoid valve (14), when the solenoid (28) is not excited the closing element (43) is raised from the valve seat (46) because of the action of a resetting spring (70), which comprises the following features:

integrally formed on the tappet (41) is a hollow cylindrical shoulder (53) which surrounds the closing element (43) with a clearance, the shoulder (53) and the valve body (45) are provided in a region of the annular channel (64) with end faces (56, 67) that extend at right angles to the tappet axis (52) with a slight radial gap (68, 69) in the closed position of the seat valve (44), an outlet of the seat valve (44) is connected to the annular channel (64) at least inside the shoulder (53), and a pressure fluid channel (61) leads from the outlet of the seat valve (44) into the valve dome (27).

2. The solenoid valve as claimed in claim 1, wherein the resetting spring (70) which acts on the valve body (45) and on the shoulder (53) of the tappet (41) is accommodated in the annular channel (64).

3. The solenoid valve as claimed in claim 1, wherein the housing bore (42, 59) surrounds a section of the tappet (41) on the seat valve side with a clearance, and the pressure fluid channel (61) is constructed to include bores (58), which extend at least approximately radially and lead from the annular space (57) of the hollow cylinder shoulder (53) into the housing bore (42), and as a flat surface (60) of the tappet on the circumferential side, as well as as a longitudinal groove (38) in the magnet armature (32).

* * * * *